(12) United States Patent
Hou (10) Patent No.: US 7,832,935 B2
(45) Date of Patent: Nov. 16, 2010

(54) ROTATABLE MEMBER AND METHOD FOR MANUFACTURING THE SAME

(75) Inventor: Chuen-Shu Hou, Taipei Hsien (TW)

(73) Assignee: Foxconn Technology Co., Ltd., Tu-Cheng, Taipei Hsien (TW)

( * ) Notice: Subject to any disclaimer, the term of this patent is extended or adjusted under 35 U.S.C. 154(b) by 871 days.

(21) Appl. No.: 11/735,022

(22) Filed: Apr. 13, 2007

(65) Prior Publication Data

US 2008/0175524 A1   Jul. 24, 2008

(30) Foreign Application Priority Data

Jan. 24, 2007   (CN) .................... 2007 1 0073105

(51) Int. Cl.
*F16C 33/02* (2006.01)
*F16C 33/10* (2006.01)

(52) U.S. Cl. .................... 384/276; 384/283; 216/50; 216/83; 29/895

(58) Field of Classification Search ............... 384/292, 384/276, 279, 372; 216/52, 56, 83, 109; 29/895; 428/319.1, 310.5, 440
See application file for complete search history.

(56) References Cited

U.S. PATENT DOCUMENTS

| | | | |
|---|---|---|---|
| 3,911,188 A * | 10/1975 | Torti et al. .................... 428/218 |
| 4,514,238 A * | 4/1985 | Shibata ........................ 148/431 |
| 4,548,903 A * | 10/1985 | Weiss et al. .................. 216/109 |
| 5,238,885 A * | 8/1993 | Asayama et al. ............ 501/98.3 |
| 5,284,822 A * | 2/1994 | Sakai et al. .................. 501/102 |
| 5,571,611 A * | 11/1996 | Nagano et al. ........... 428/319.1 |
| 6,171,511 B1 | 1/2001 | Charollais et al. |
| 2003/0190101 A1* | 10/2003 | Horng et al. ................. 384/278 |
| 2005/0172888 A1* | 8/2005 | Gosain et al. ................. 117/87 |

FOREIGN PATENT DOCUMENTS

| | | | |
|---|---|---|---|
| JP | 03066460 A | * | 3/1991 |
| JP | 07268474 A | * | 10/1995 |
| JP | 9-41071 A | * | 2/1997 |
| JP | 09059733 A | * | 3/1997 |
| JP | 10204580 A | * | 8/1998 |
| JP | 2001354479 A | * | 12/2001 |
| KR | 100635479 B1 | | 10/2006 |
| TW | 1233968 | | 6/2005 |
| WO | 2006/087498 A1 | | 8/2006 |

* cited by examiner

*Primary Examiner*—Marcus Charles
(74) *Attorney, Agent, or Firm*—Jeffrey T. Knapp (57) ABSTRACT

A bearing (100) has a contact surface (110) for mating with a rotatable member. The contact surface has a plurality of crystalline grains (120) distributed at random; a plurality of micro-grooves (130) are formed among the crystalline grains; the micro-grooves communicate with each other thereby forming a net. The micro-grooves accommodate lubricant therein so that when the rotatable member rotates, a sufficient lubrication can be obtained between the bearing and the rotatable member. The bearing is formed by machining and then thermally etching a preform which is formed by powder metallurgy.

11 Claims, 7 Drawing Sheets

ROTATABLE MEMBER AND METHOD FOR MANUFACTURING THE SAME

BACKGROUND OF THE INVENTION

1. Field of the Invention

The present invention relates to a rotatable member, particularly to a method for manufacturing a bearing or a shaft having good lubricant retention.

2. Description of Related Art

At present, bearings are widely used in spindle motors in devices, such as compact disc (CD) drivers, digital video disc (DVD) drivers, hard disk drivers, laser beam printers, floppy disk drivers or in heat-dissipation fans. Spindle motors require bearings of small size, high rotational accuracy and long life. A related bearing defines a bearing hole therein. A shaft is rotatably received in the bearing hole. Lubricant is often used between an inner circumferential surface of the bearing and an external circumferential surface of the shaft to reduce abrasion of the bearing and the shaft. However, the lubricant is prone to leak out of the related bearing so that the bearing cannot work normally due to lack of lubricant. Thus, lubricant retention becomes a problem in the related bearing.

It is therefore desirable to provide a bearing having good lubricant retention and a long operating life, and a method for manufacturing the same.

SUMMARY OF THE INVENTION

A rotatable member has a rotatable contact surface mating with a stable member; the contact surface has a plurality of crystalline grains distributed at random; a plurality of micro-grooves are formed among the crystalline grains; the micro-grooves communicate with each other thereby forming a net. The micro-grooves can retain lubricant therein, whereby a rotation of the rotatable member in respect to the stable member can be more smoothly proceeded. The micro-grooves are obtained by thermally etching the contact surface of the rotatable member, which is formed by machining a preform made of powder metallurgy.

Other advantages and novel features of the present invention will become more apparent from the following detailed description of preferred embodiment when taken in conjunction with the accompanying drawings.

BRIEF DESCRIPTION OF THE DRAWINGS

Many aspects of the present driving device can be better understood with reference to the following drawings. The components in the drawings are not necessarily drawn to scale, the emphasis instead being placed upon clearly illustrating the principles of the present driving device. Moreover, in the drawings, like reference numerals designate corresponding parts throughout the several views.

DETAILED DESCRIPTION OF THE INVENTION

Figure 1:
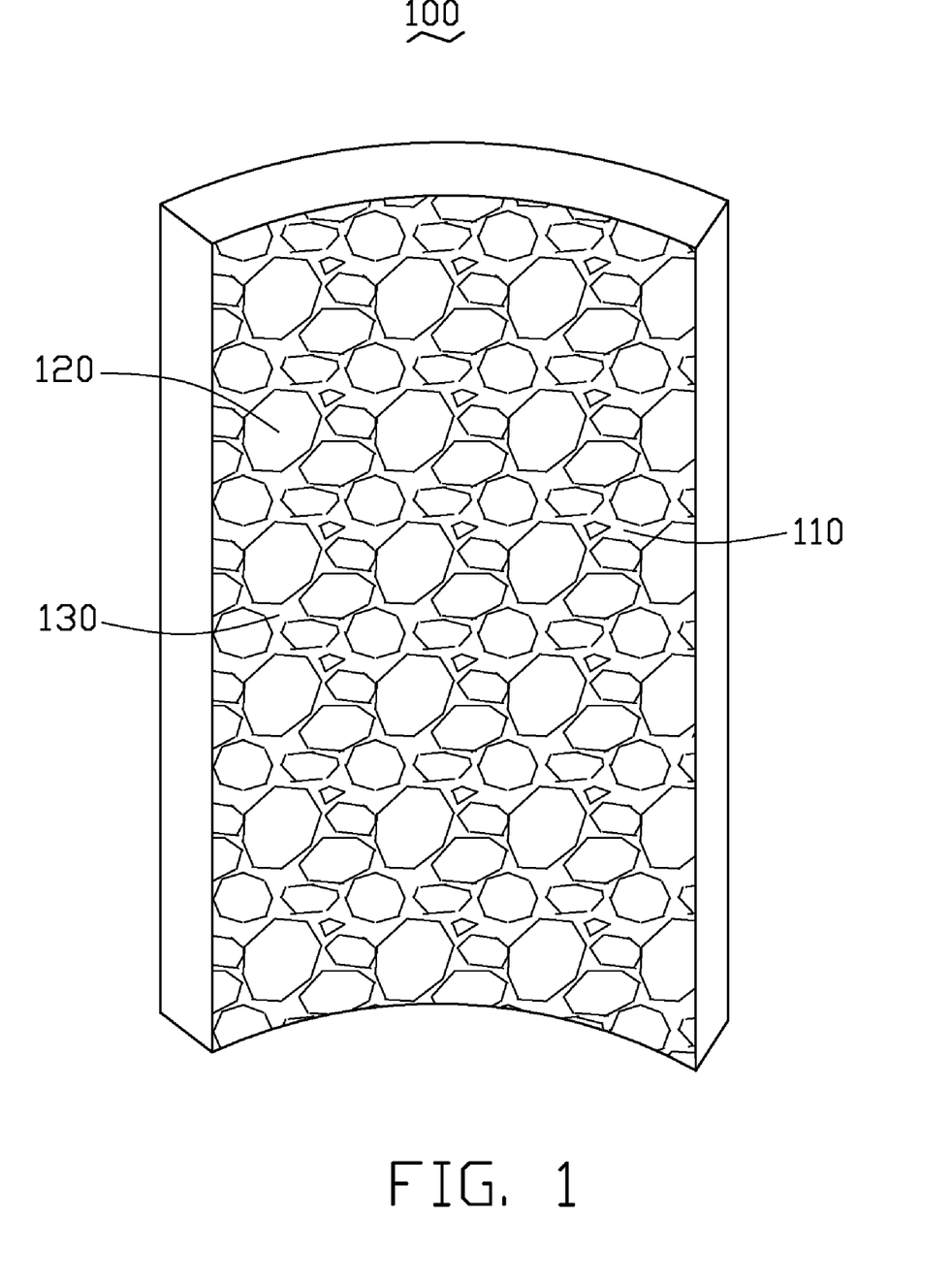
FIG. 1 is a microscopic view of an inner circumferential surface of a bearing after thermal etching in accordance with a preferred embodiment of the present invention.
Figure 2:
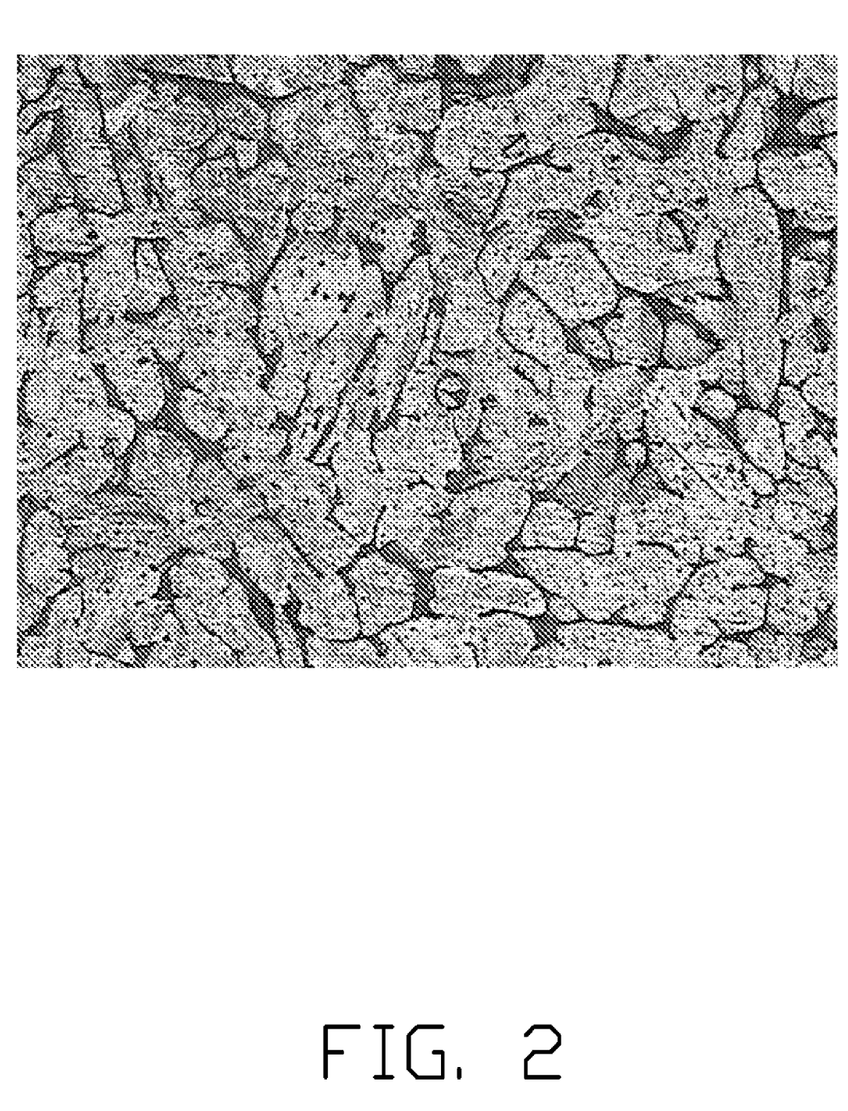
FIG. 2 is a scanning electron micrograph of the bearing of FIG. 1.

Referring to FIG. 1 and FIG. 2, a bearing 100 in accordance with a preferred embodiment of the present invention is shown. The bearing 100 has an inner circumferential surface 110 on which a plurality of crystalline grains 120 are distributed at random. The crystalline grains 120 abut against each other and a plurality of micro-grooves 130 are formed among the crystalline grains 120. The micro-grooves 130 communicate with each other thereby forming a net. The micro-grooves 130 having millimeter-sized width can retain lubricant adhered to the inner circumferential surface 110 of the bearing 100 through their large capillary attraction, especially when the bearing 100 is in a non-operational state. Furthermore, the micro-grooves 130 each have differing widths and extension directions so that the micro-grooves 130 can be used for generating hydrodynamic pressure to support a shaft (not shown) rotating in the bearing 100.

Figure 3:
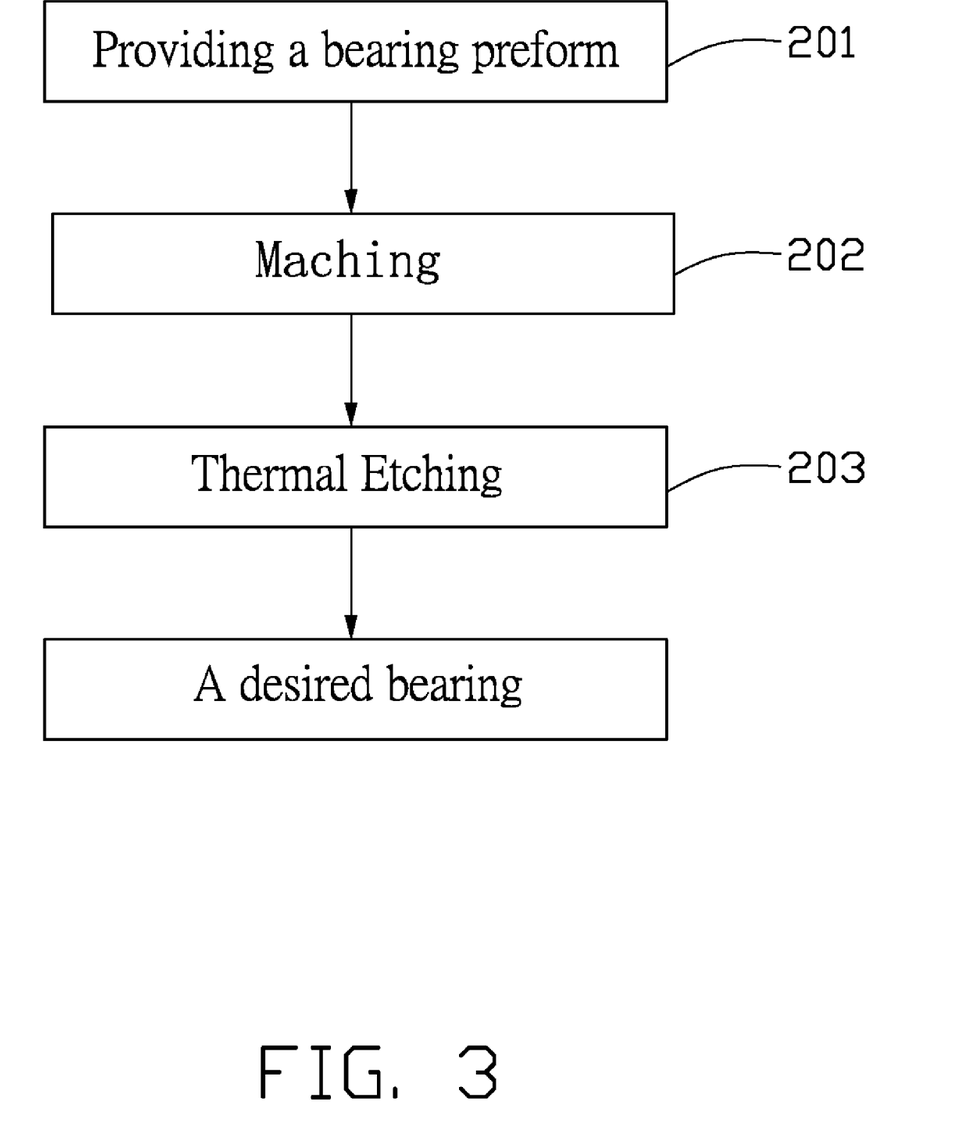
FIG. 3 is a flow chart of a method employed in manufacturing the bearing of FIG. 1.

Referring to FIG. 3, a method for manufacturing the bearing 100 in accordance with the present invention comprises steps of:

step 201: providing a bearing preform (not shown), wherein the bearing preform can be manufactured through a powder metallurgical method (e.g., sintering);

step 202: performing a machining to the bearing preform; and step 203: performing thermal etching to the bearing preform, thereby forming the desired bearing 100.

Step 202 is described in detail as follows: the machining methods include broaching, grinding, milling, polishing and so on. The machining process results in destroying atomic bond structures (not shown) between the atoms (not shown) in an inner circumferential surface (not shown) of the bearing preform. Accordingly, unit cell structures composed by the atoms in the inner circumferential surface of the bearing preform are also destroyed. Furthermore, a bore diameter defined by the inner circumferential surface of the bearing preform is machined to be 1 μm to 16 μm larger than an outer diameter of the shaft to be rotated in the bearing 100.

Step 203 is described in detail as follows: thermal etching used in related metallographic analysis is used in the step 203. $T_m$ is taken as a melting point of the bearing preform and a temperature in the thermal etching process should be controlled in an approximate range between 0.25 $T_m$ and 0.75 $T_m$. As for the bearing preform made by means of powder metallurgy, a temperature in thermal etching should be lower than a temperature in powder metallurgy. It should take about 30 minutes to 2 hours during the thermal etching process.

Figure 4:
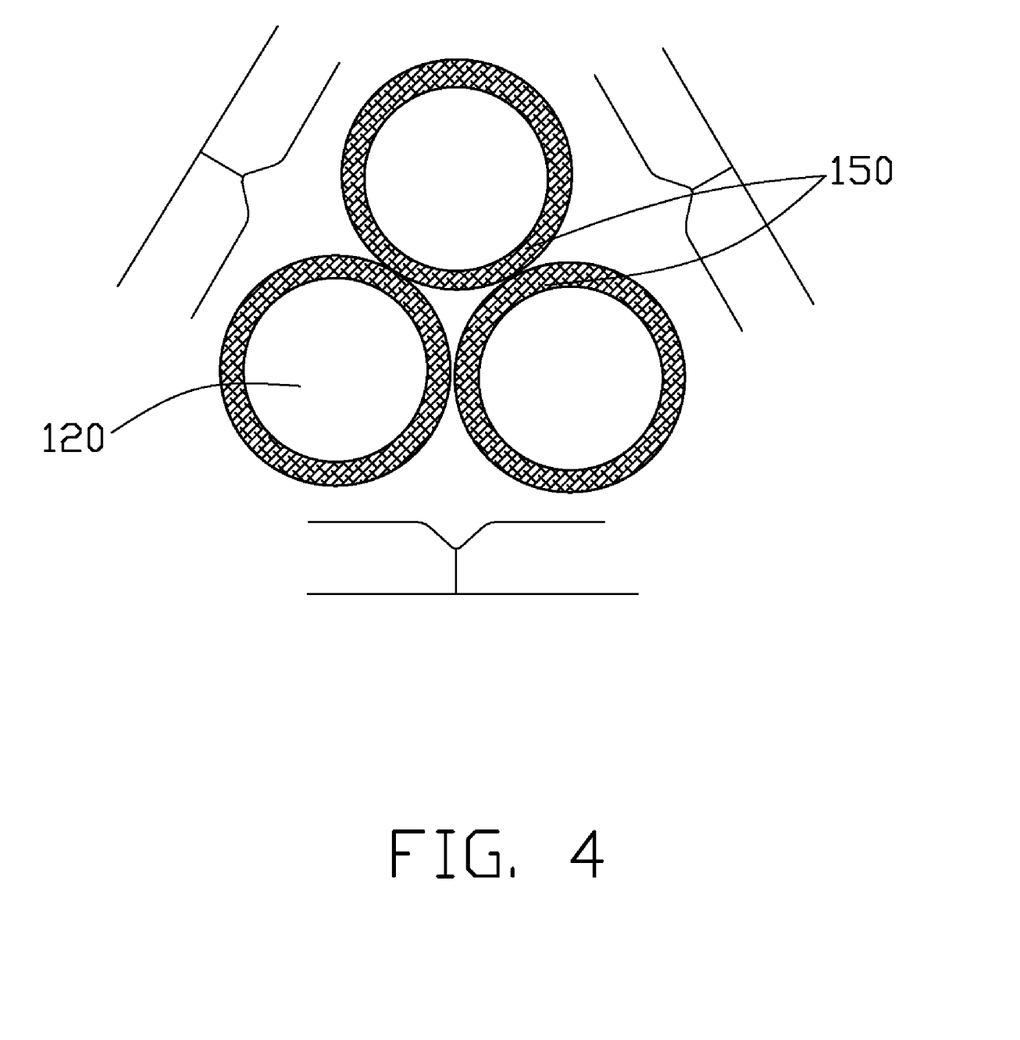
FIG. 4 is a microstructure of crystal grain particles distributing in an inner circumferential surface of a bearing perform after machining in accordance with a preferred embodiment of the present invention.

Referring to FIG. 4, after step 202, the destroyed atomic bond structures of the unit cells of the bearing preform are shown. A group of the unit cells having identical orientation form the crystalline grain 120. A plurality of the crystalline grains 120 with different orientations form the bearing preform. A plurality of grain boundaries 150 is formed between the crystalline grains 120. After machining, there is energy difference between an interior of the crystalline grains 120 with low energy and the grain boundaries 150 with high energy. During step 203, substances in the grain boundaries 150 are activated by energy of thermal etching to break away from the grain boundaries 150 or enter the interior of the crystalline grains 120. Accordingly, the grain boundaries 150 are turned into hollow micro-grooves 130. The micro-grooves 130 separate the crystalline grains 120. The micro-grooves 130 each have a minimum width between 30 nm-50 nm and a maximum width between 0.1 mm-0.2 mm, depending on the size of the crystalline grains 120. The width of the micro-grooves 130 is substantially similar to a width of the grain boundaries 150, since the micro-grooves 130 are formed by removing the substance in the grain boundaries 150 by thermally etching the preform after machining the preform. The micro-grooves 130 have large capillary attraction, thus enabling lubricant to be retained in the micro-grooves 130 when the shaft does not rotate, even at high temperature such as those experienced after heavy use. The widths of the micro-grooves 130 vary along extension directions thereof because the crystalline grains 120 have different shapes and sizes. The thermal etching process diffuses from the grain boundaries 150 to the interior of the crystalline grains 120 gradually so that thermal etching in the grain boundaries 150 is faster than that in the interior of the crystalline grains 120. Thus, widths and depths of the micro-grooves 130 decrease from peripheries of the crystalline grains 120 to the interior of the crystalline grains 120 gradually during the thermal etching process. Accordingly, when the lubricant is driven to flow through the micro-grooves 130 with different cross-sections during rotation of the shaft, a hydrodynamic shearing stress and dynamic pressure can be generated between the inner circumferential surface 110 of the bearing 100 and an external circumferential surface of the shaft. Thus, the shaft is supported by the shearing stress and dynamic pressure. Furthermore, abrasion of the bearing 100 or the shaft can be reduced.

Figure 5:
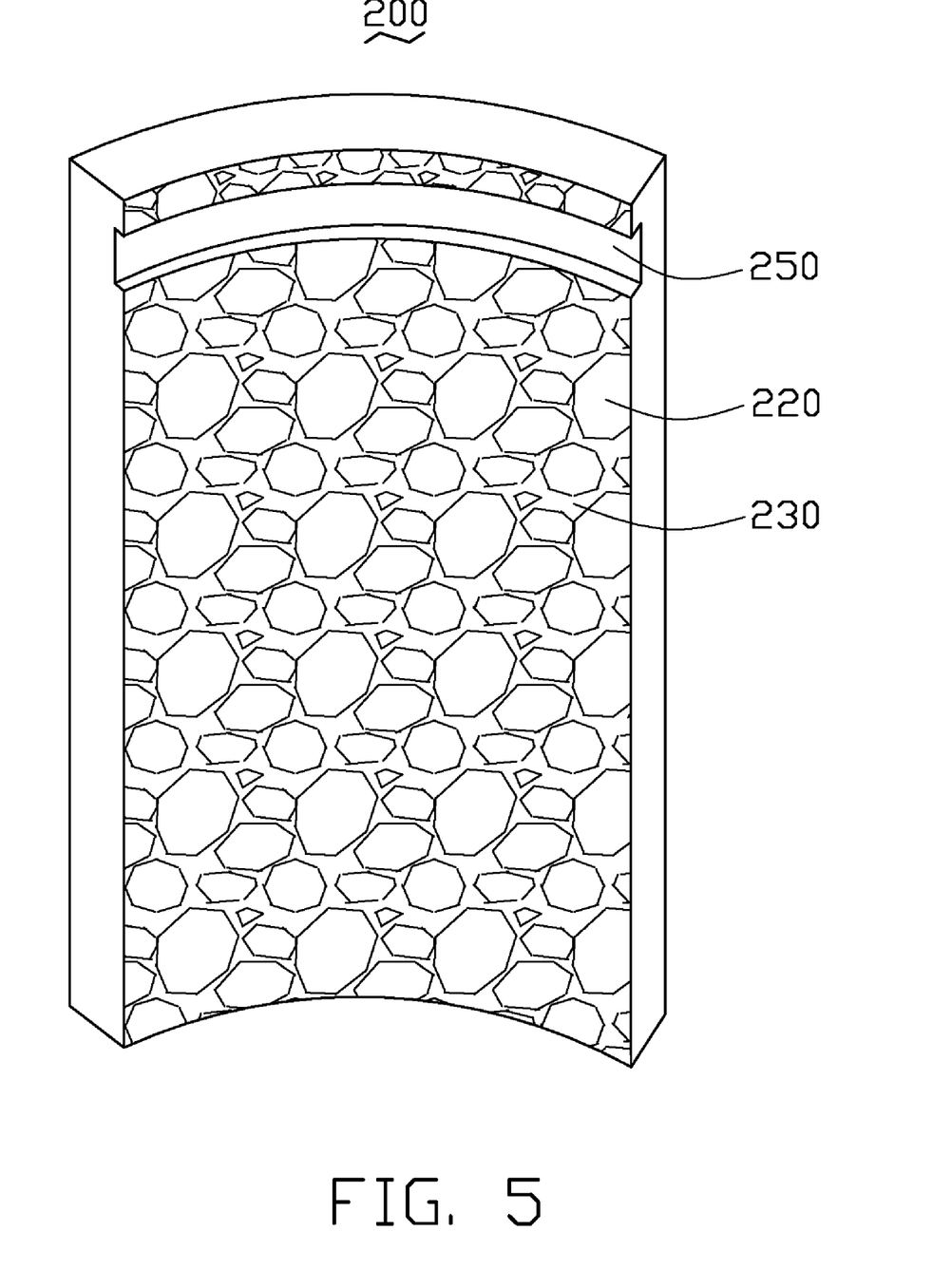
FIG. 5 is a microscopic view of an inner circumferential surface of a bearing after thermal etching in accordance with a second embodiment of the present invention.

Referring to FIG. 5, a bearing 200 in accordance with a second embodiment of the present invention is shown. The bearing 200 has a plurality of crystalline grains 220 in an inner circumferential surface thereof. A plurality of micro-grooves 230 are formed between the crystalline grains 220. The method of making the micro-grooves 130 of the bearing 100 can also be used to make the micro-grooves 230 of the bearing 200. The difference between the bearing 200 and the bearing 100 is that an annular holding groove 250 is defined near an upper open side of the inner circumferential surface of the bearing 200. The holding groove 250 can be used to further help accommodating lubricant of the bearing 200 therein. Thus, the bearing 200 configured by the holding groove 250 can prevent the lubricant from leaking from the upper open side thereof. It is noted that, a process to manufacture the holding groove 250 should preferably take place after the step 203 because the holding groove 250 without the micro-grooves 230 can prevent the lubricant from flowing upwardly to the upper open side of the bearing 200 via the holding groove 250, especially when the bearing 200 is in operation. Thus, the lubricant can be better retained in the bearing 200.

Figure 6:
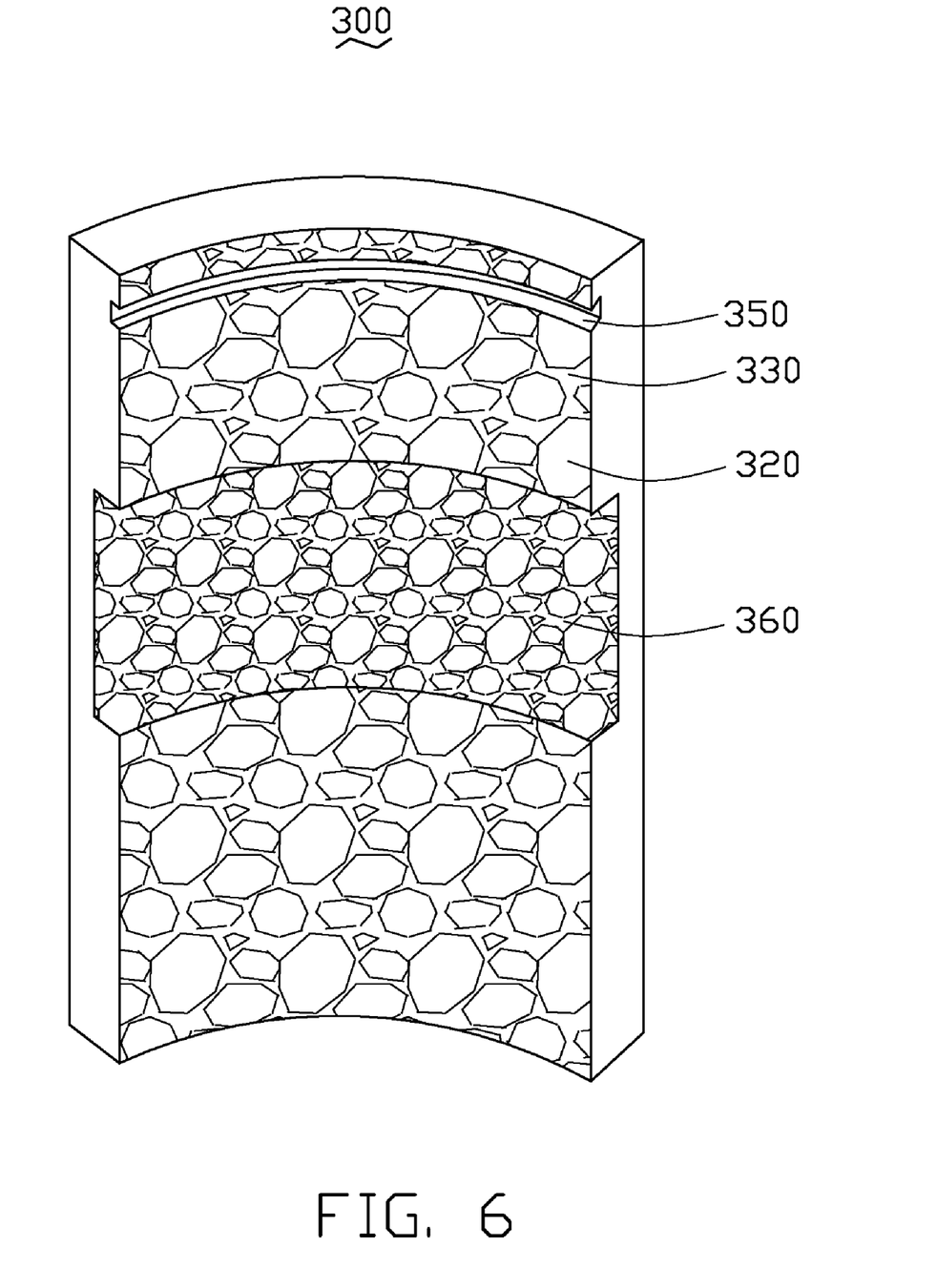
FIG. 6 is a microscopic view of an inner circumferential surface of a bearing after thermal etching in accordance with a third embodiment of the present invention.

Referring to FIG. 6, a bearing 300 in accordance with a third embodiment of the present invention is shown. The bearing 300 has a plurality of crystalline grains 320 in an inner circumferential surface thereof and a holding groove 350 which are respectively similar to the crystalline grains 220 and the holding groove 250 of the bearing 200. A plurality of micro-grooves 330 are formed between the crystalline grains 320. The method of making the micro-grooves 230 of the bearing 200 and the holding groove 250 can also be used to make the micro-grooves 330 and the holding groove 350. The difference between the bearing 300 and the bearing 200 is that the bearing 300 further comprises an annular oil retaining groove 360 defined in a middle of the inner circumferential surface thereof. The oil retaining groove 360 is wider than the holding groove 350. The oil retaining groove 360 can be used to accommodate the lubricant which will flow in the bearing 300. Manufacturing of the oil retaining groove 360 should preferably take place before step 203. Thus, the lubricant in the oil retaining groove 360 can easily flow out of the oil retaining groove 360 through the micro-grooves 330 and be distributed along the inner circumferential surface of the bearing 300.

Figure 7:
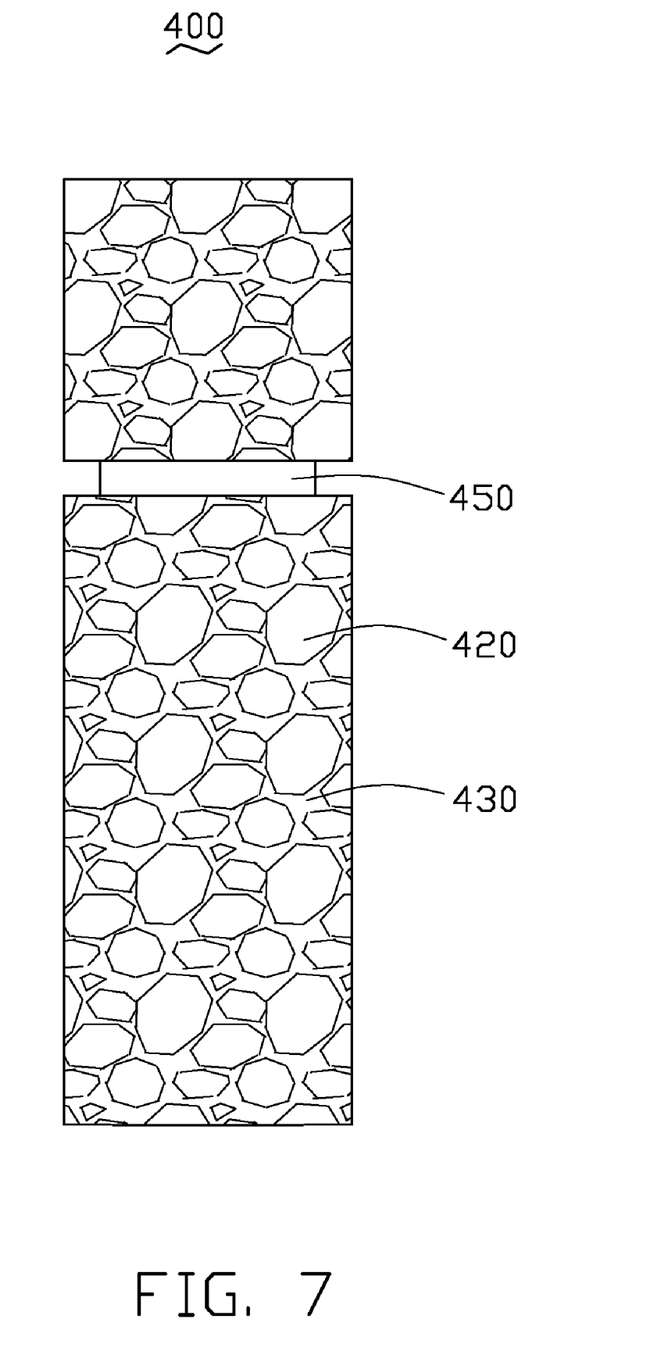
FIG. 7 is a microscopic view of an external circumferential surface of a shaft after thermal etching in accordance with a fourth embodiment of the present invention.

Referring to FIG. 7, a shaft 400 in accordance with a fourth embodiment of the present invention is shown. The shaft 400 is rotatably received in a bearing (not shown). The shaft 400 has a plurality of crystalline grains 420 in an external circumferential surface thereof and an annular holding groove 450 defined therein. A plurality of micro-grooves 430 are formed between the crystalline grains 420. The method of making the micro-grooves 230 of the bearing 200 and the holding groove 250 can also be used to make the micro-grooves 430 and the holding groove 450. The holding groove 450 can be used to accommodate lubricant. Furthermore, the shaft 400 can define a retaining groove (not shown) therein that is similar to the retaining groove 360.

The micro-grooves 130, 230, 330, 430 and the holding groove 250, 350, 450, and the retaining groove 360 can also be formed in contacting surfaces of other rotatable members or stable members engaging with the rotatable members. The bearings 100, 200, 300 and the shaft 400, or the rotatable and stable members, can be made of a substance chosen from the group consisting of metal, ceramic alloy and any suitable combination of these substances. Moreover, the bearings 100, 200, 300 and the shaft 400 having the micro-grooves 130, 230, 330, 430 can be made by means of chemical etching. During the chemical etching process, the bearings 100, 200, 300 or the shaft 400 is etched in an insulative liquid, for example gasoline, benzene and lubricant oil, or it can be etched in dehumidified air.

What is claimed is:

1. A rotatable member having a rotatable contact surface mating with a stable member, the contact surface having a plurality of crystalline grains randomly distributed thereat, a plurality of micro-grooves formed among the crystalline grains, the micro-grooves communicating with each other thereby forming a net, the micro-grooves accommodating lubricant therein and each of the micro-grooves having a width similar to a width of a grain boundary between two neighboring ones of the crystalline grains for forming the each of the micro-grooves, an annular holding groove being defined near an open side of the contact surface of the rotatable member, a portion of the rotatable member defining the holding groove without the micro-grooves formed therein.

2. The rotatable member as claimed in claim 1, wherein the rotatable member is one of a bearing and a shaft.

3. The rotatable member as claimed in claim 1, wherein the each of the micro-grooves has a minimum width between 30 nm-50 nm and a maximum width between 0.1 mm-0.2 mm.

4. The rotatable member as claimed in claim 1, wherein extension directions of the micro-grooves are different from each other, and widths and depths of the micro-grooves gradually decrease from peripheries of the crystalline grains to interiors of the crystalline grains.

5. The rotatable member as claimed in claim 1, wherein the rotatable member comprises an annular oil retaining groove defined in a middle thereof, a portion of the rotatable member defining the annular oil retaining groove being formed with the micro-grooves.

6. The rotatable member as claimed in claim 1, wherein the rotatable member is made of a substance chosen from the group consisting of metal, ceramic alloy and any combination of these substances.

7. A rotatable member having a rotatable contact surface mating with a stable member, the contact surface having a plurality of crystalline grains randomly distributed thereat, a plurality of micro-grooves formed among the crystalline grains, the micro-grooves communicating with each other thereby forming a net, the micro-grooves accommodating lubricant therein and each of the micro-grooves having a width similar to a width of a grain boundary between two neighboring ones of the crystalline grains for forming the each of the micro-grooves, the rotatable member also having an annular oil retaining groove defined in a middle thereof, a portion of the rotatable member defining the annular oil retaining groove being formed with the micro-grooves.

8. The rotatable member as claimed in claim 7, wherein the rotatable member is one of a bearing and a shaft.

9. The rotatable member as claimed in claim 7, wherein the each of the micro-grooves has a minimum width between 30 nm-50 nm and a maximum width between 0.1 mm-0.2 mm.

10. The rotatable member as claimed in claim 7, wherein extension directions of the micro-grooves are different from each other, and widths and depths of the micro-grooves gradually decrease from peripheries of the crystalline grains to interiors of the crystalline grains.

11. The rotatable member as claimed in claim 7, wherein the rotatable member is made of a substance chosen from the group consisting of metal, ceramic alloy and any combination of these substances.

\* \* \* \* \*